United States Patent [19]
Nguyen et al.

[11] Patent Number: 5,320,777
[45] Date of Patent: Jun. 14, 1994

[54] FOAM CONTROL COMPOSITIONS

[75] Inventors: Duy T. Nguyen; Charles J. Berzansky, Jr., both of Jacksonville, Fla.

[73] Assignee: Betz PaperChem, Inc., Jacksonville, Fla.

[21] Appl. No.: 896,258

[22] Filed: Jun. 10, 1992

[51] Int. Cl.$^5$ .................... B01D 19/04; C09K 3/00
[52] U.S. Cl. .................... 252/358; 162/158; 252/321
[58] Field of Search .................... 252/324, 358

[56] References Cited

U.S. PATENT DOCUMENTS

| | | | |
|---|---|---|---|
| 2,753,309 | 7/1956 | Figdor | 252/358 |
| 3,198,744 | 8/1965 | Lamont | 252/321 |
| 3,705,860 | 12/1972 | Duvall | 252/358 |
| 3,723,342 | 3/1973 | Shane et al. | 252/358 |
| 3,935,121 | 1/1976 | Lieberman et al. | 252/321 |
| 3,959,175 | 5/1976 | Smith, Jr. et al. | 252/321 |
| 4,208,301 | 6/1980 | Gammon | 252/321 |
| 4,631,145 | 12/1986 | Zychal | 252/321 |
| 5,080,834 | 1/1992 | Clumpner et al. | 554/227 |

Primary Examiner—Richard D. Lovering
Attorney, Agent, or Firm—Alexander D. Ricci; Gregory M. Hill

[57] ABSTRACT

A method for reducing or preventing the generation of foam in aqueous environments by adding to the aqueous medium from 1.0 to 500 ppm of a foam control composition consisting of a β-branched aldol ether alcohol, at least one surfactant having a melting point less than 20° C. and a low HLB ethylene oxide-propylene oxide block copolymer.

6 Claims, 10 Drawing Sheets

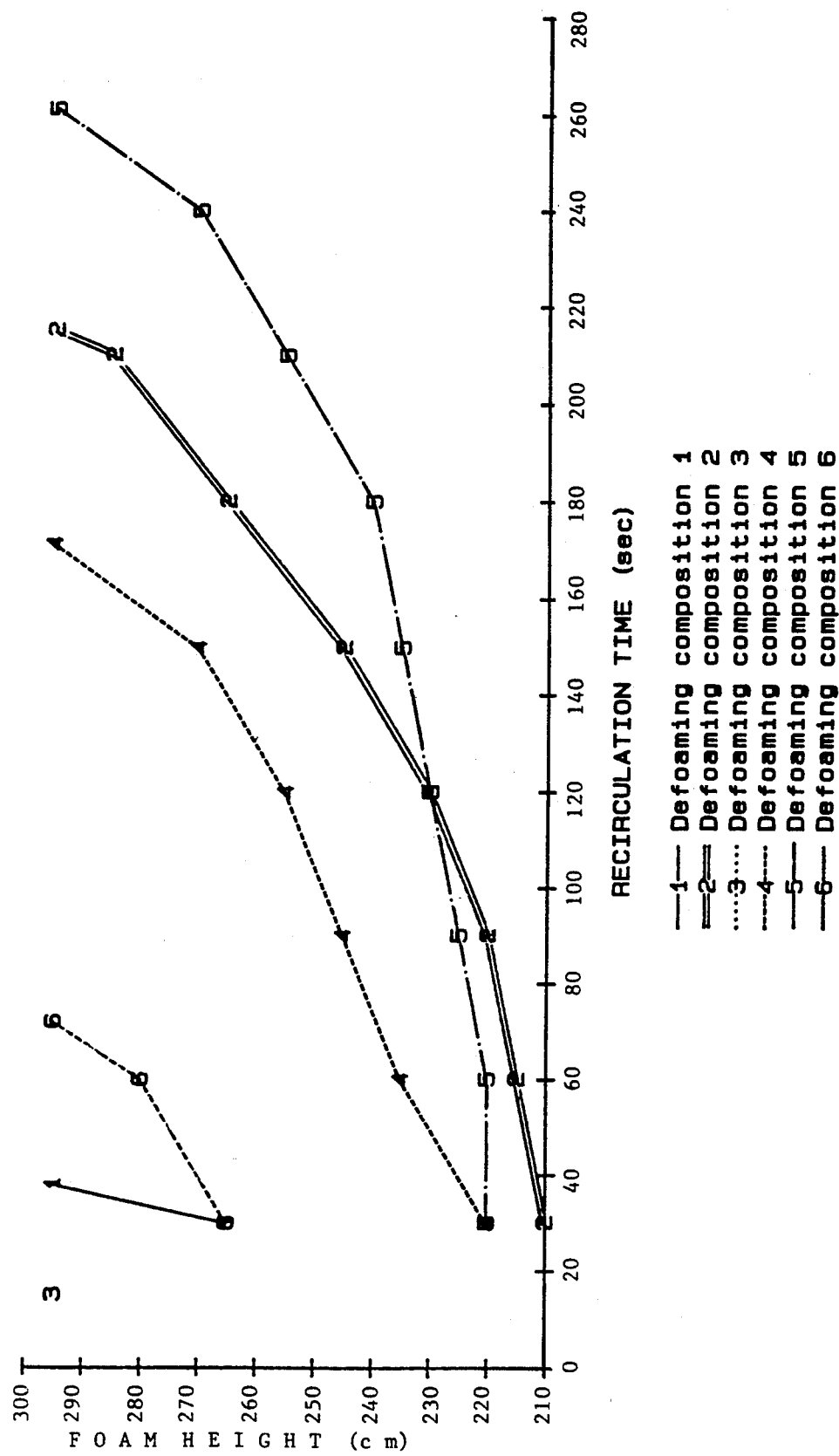

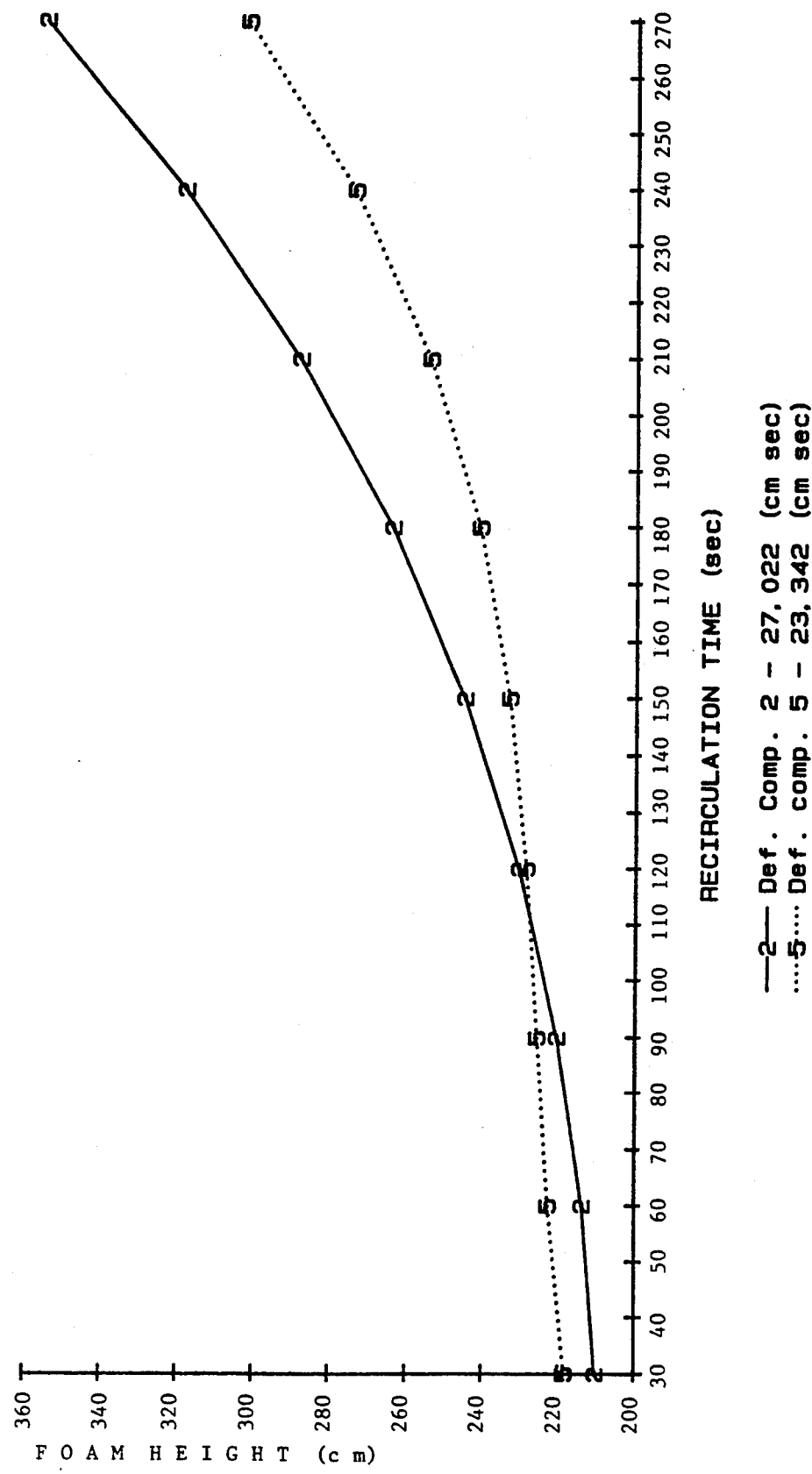

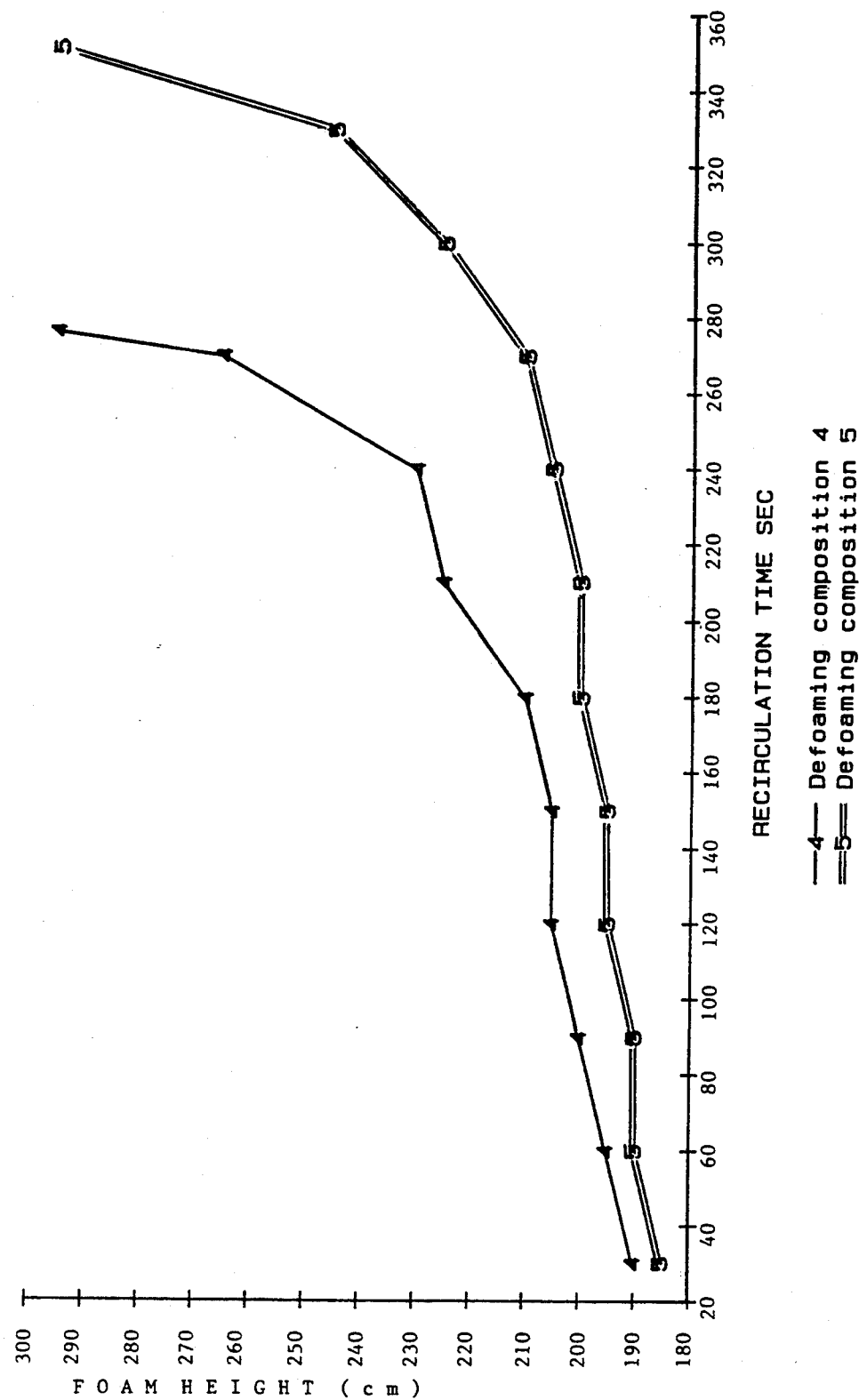

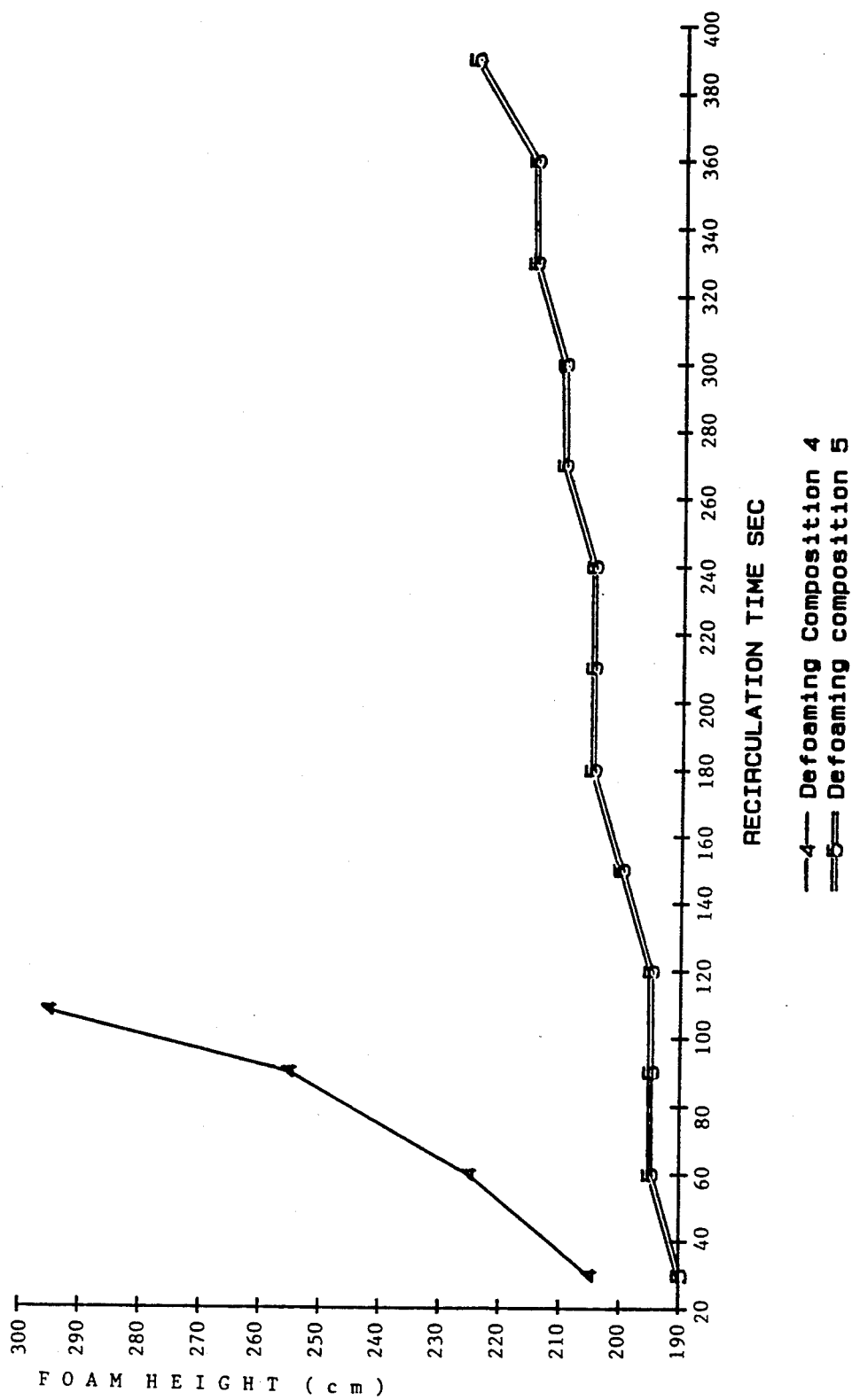

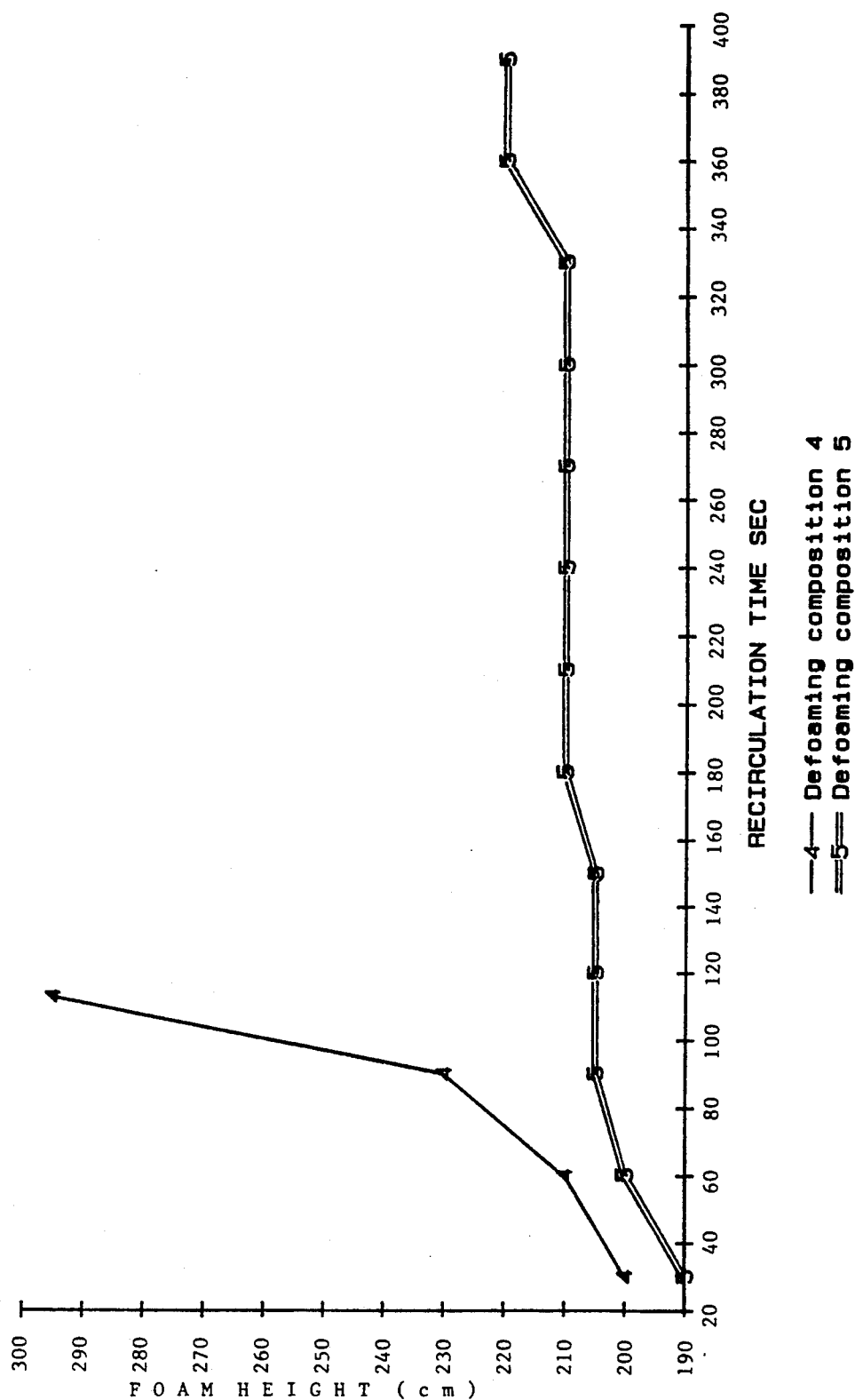

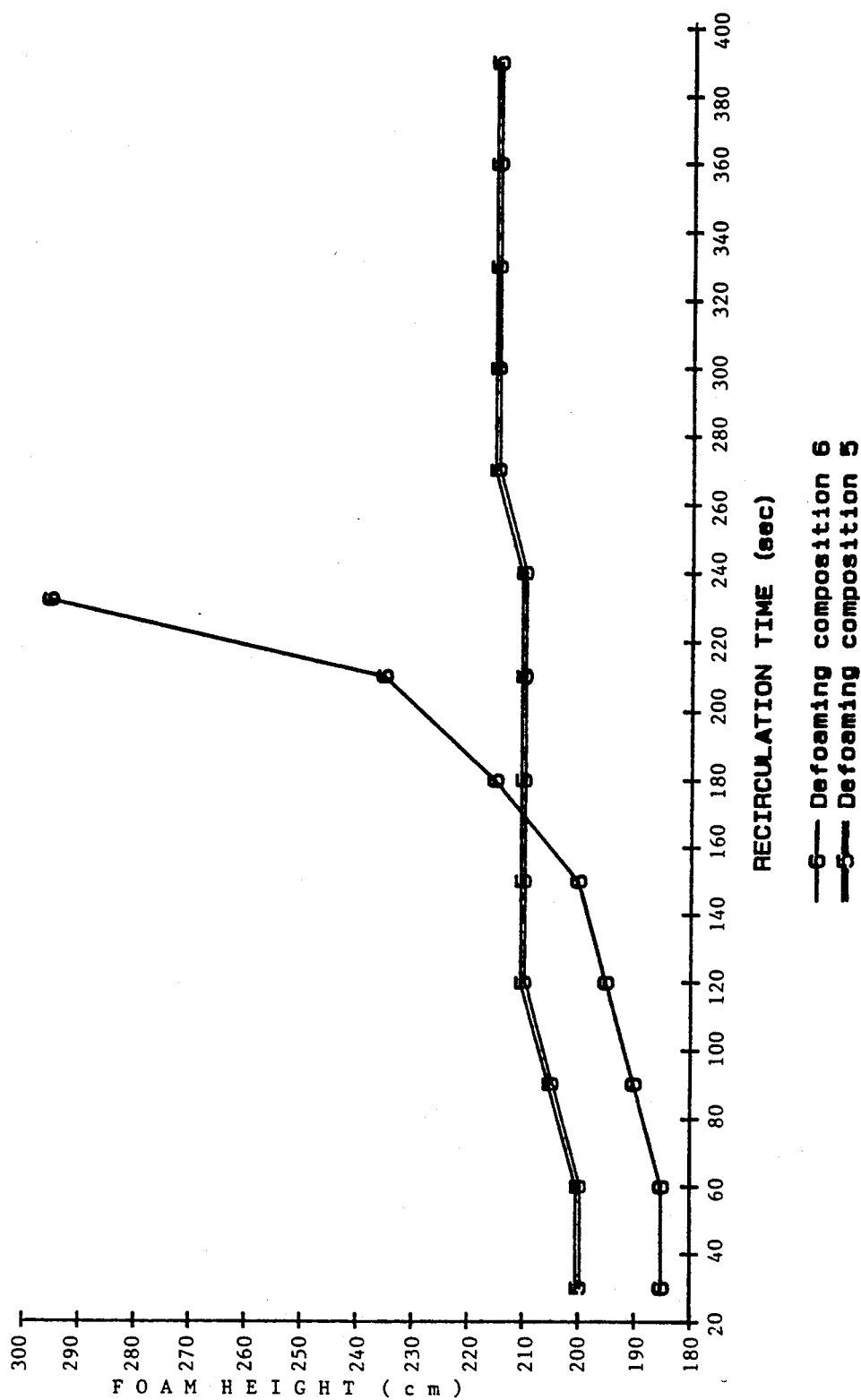

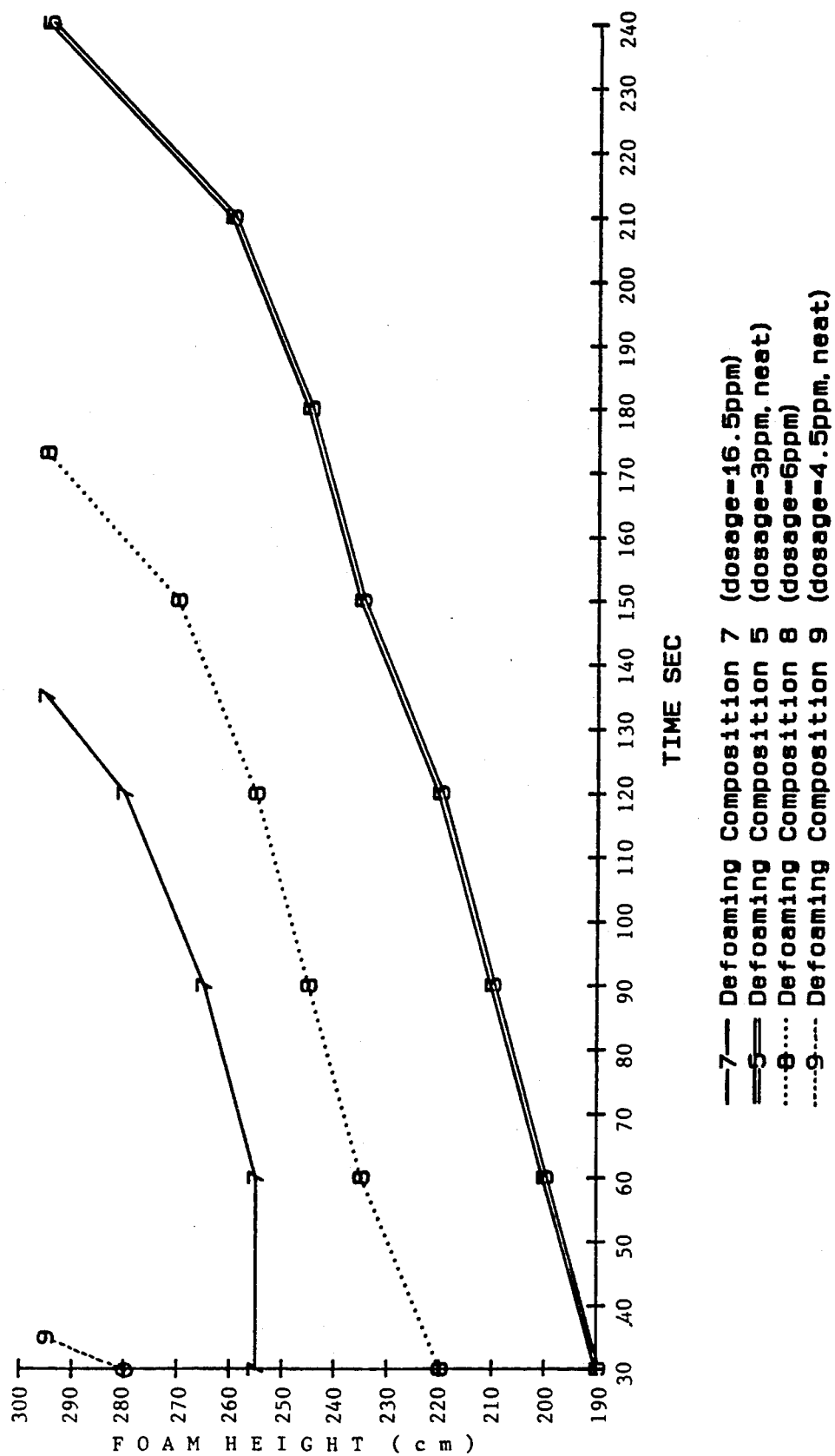

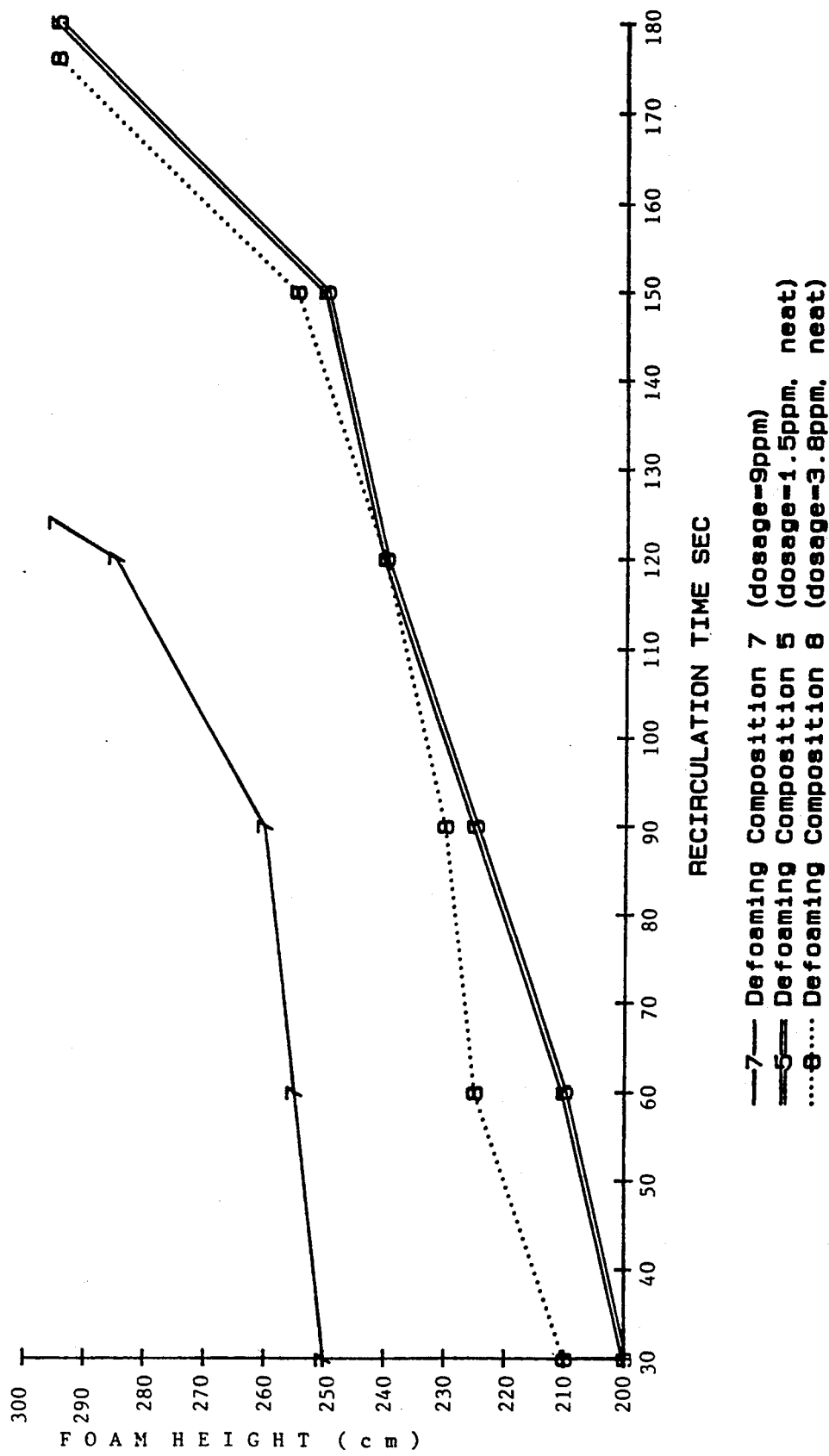

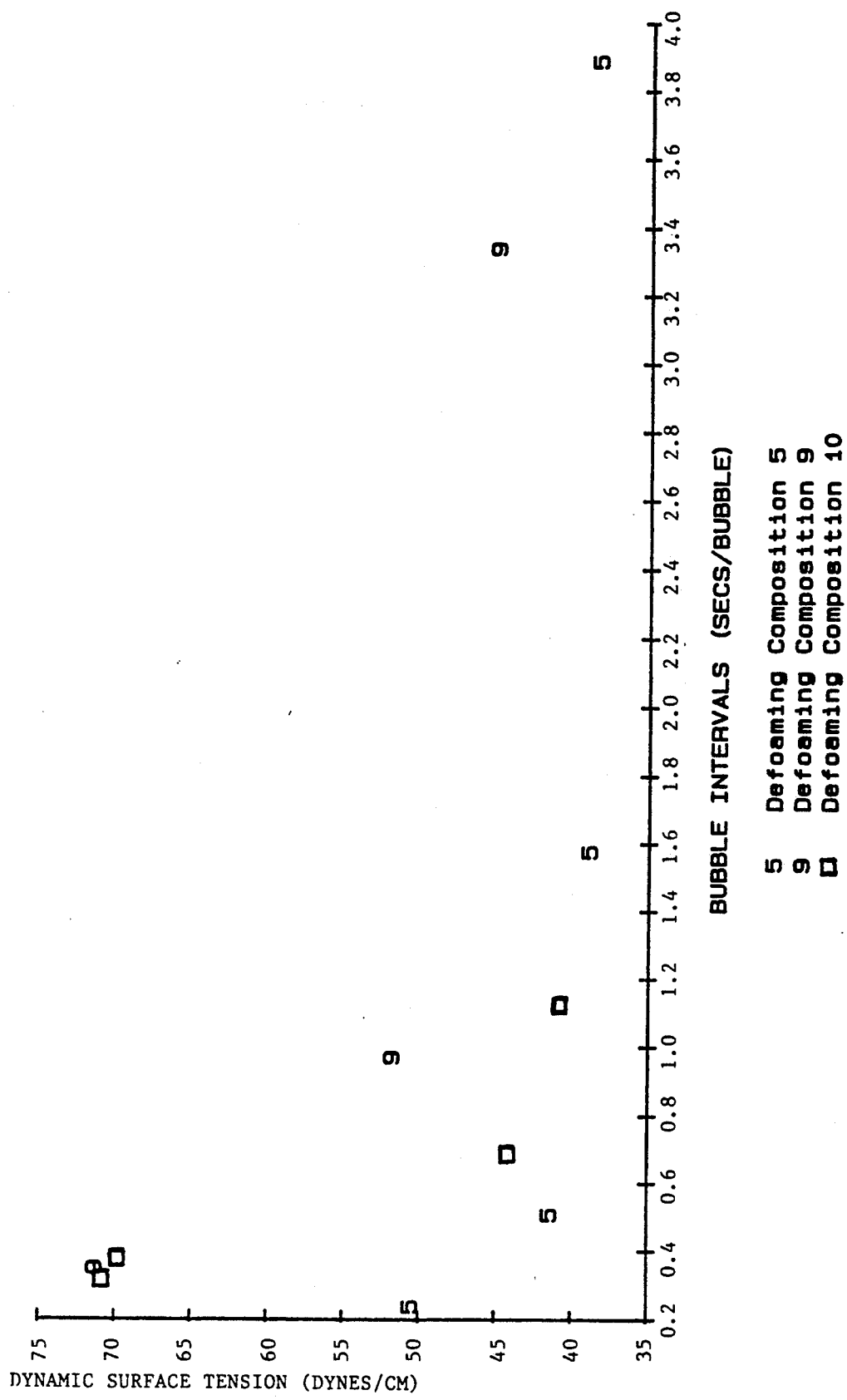

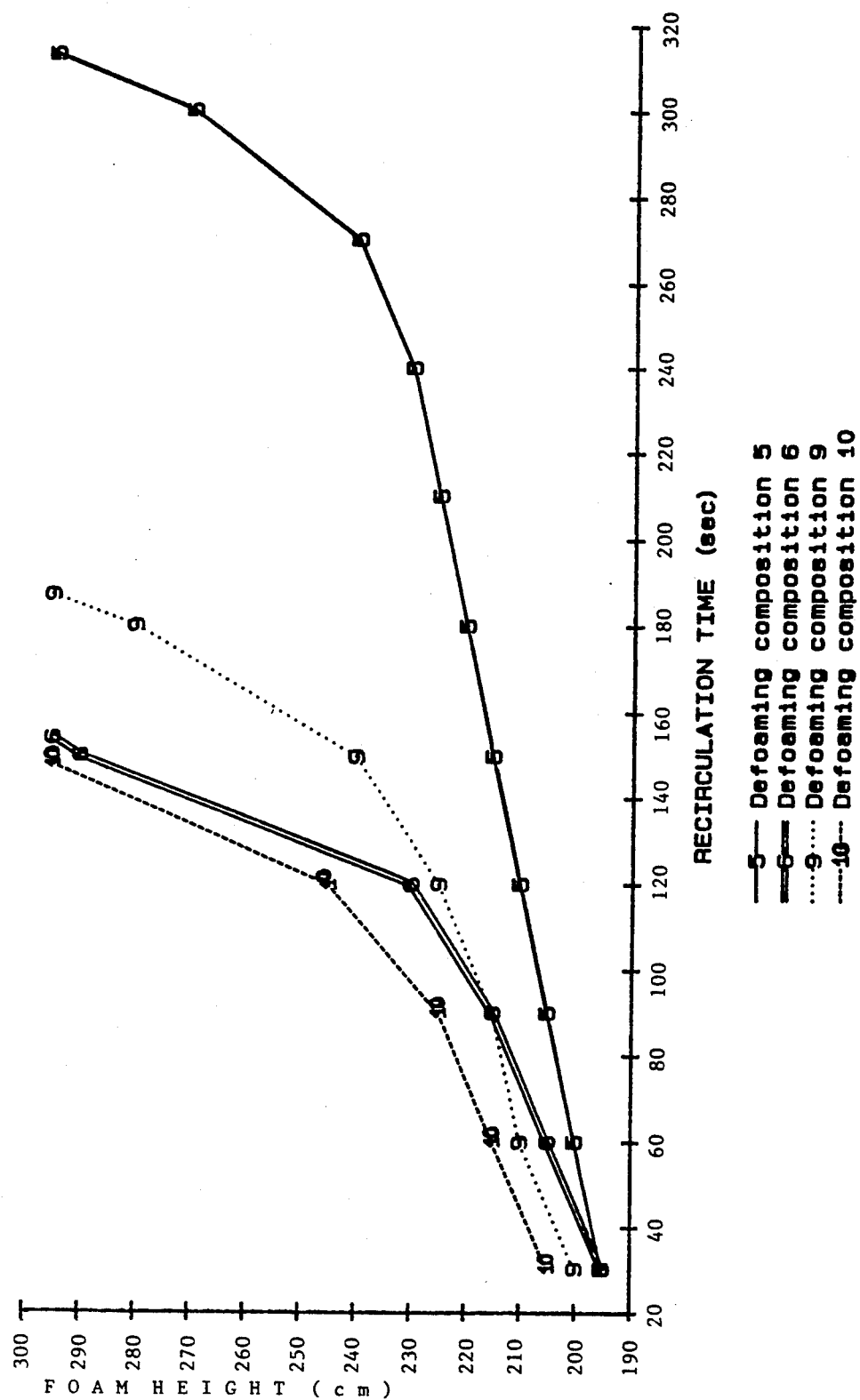

FOAM CONTROL COMPOSITIONS

FIELD OF THE INVENTION

The present invention relates to foam control compositions, their preparation and use in aqueous systems. These foam control compositions are particularly effective in pulp and paper processing.

BACKGROUND OF THE INVENTION

The persistence of foam in various aqueous industrial operations can cause process inefficiency and in some cases an inferior final product. The paper industry experiences some of the most troublesome foam problems. Examples of common incessant foaming systems include, but are not limited to, bleach plants, screen rooms, paper machines, and effluent streams.

Foam is a colloidal system in which a gas is dispersed in a liquid. In a papermaking system, the gas is usually air and/or carbon dioxide and the liquid usually is water. Foam can exist either as bubbles of entrained air in bulk or as surface foam. Surface foam has a polyhedral shape (many-sided) which can be seen floating in chests, wire pits, trays, headboxes and on the machine wire. Surface foam is surrounded by a thin film of foam stabilizing particles of surfactant and water. Surface foam reduces drainage efficiency and causes rings, fisheyes and holes due to bursting of foam bubbles on the sheet. Surface foam also can foul papermaking equipment when surface foam collapses because it leaves behind finely divided solid particulates which are the foam stabilizing particles. Having a water shower on the surface may break the surface foam but does nothing for the entrained air.

Entrained air results in the tiny spherical bubbles finely dispersed below the surface of the liquid and adsorbed on the surface of the fibers. Entrained air can greatly decrease the drainage rate of paper stock by blocking the voids in the fiber mat with tiny bubbles and hence machine speeds may have to be reduced to provide sufficient drainage time. Entrained air can also lower some of the sheet properties such as wet strength, tensile strength, smoothness, and also increase sheet porosity.

Foam can be controlled by a variety of chemical methods. An effective antifoam should be slightly insoluble, yet dispersible in the foaming medium. The antifoam should be able to control both surface foam and entrained air over a prolonged period of time. This present antifoam invention was developed to prevent or control the above described foaming problems while avoid creating any undesirable side effects in the system or on the paper machines.

Most conventional antifoam or defoamer compounds consist of a hydrophobic material having a melting point greater than 40° C. or an insoluble material such as silica, dispersed in an oil phase. The production of these compounds requires the distinct, consecutive steps of heating and cooling. Due to the use of high melting point hydrophobic materials. the resulting compound quickly becomes unstable and the propensity for undesirable deposition in the treated aqueous system is very high.

Besides the obvious foam controlling characteristics displayed by the antifoam of the present invention, additional advantages include the ability to manufacture the antifoam under simple blending procedures without heating or cooling steps and, the ease of makedown into a water based emulsion, if necessary.

GENERAL DESCRIPTION OF THE INVENTION

The defoamer/antifoam composition of the present invention comprises a polyhydric alcohol fatty acid ester, a high molecular weight, liquid, $\beta$-branched aldol ether alcohol and a low HLB (hydrophile-lipophile balance of 1-4), high molecular weight, ethylene oxide-propylene oxide (EO-PO) block copolymer. This composition is particularly effective in reducing or preventing, hence the respective defoamer or anti-foam label, both surface and entrained air foam in the aqueous medium found in various phases of a papermaking operation. It is especially useful in treating foaming problems in white water, effluent water, and is effective with numerous types of pulp slurries, such as those produced from fine paper, secondary fiber, newsprint and linerboard.

DESCRIPTION OF RELATED ART

Many conventional foam control programs contain silicon based compositions. One such program is exemplified in U.S. Pat. No. 3,705,860 which discloses a composition containing a non-polar oil, precipitated microfine silica, a metallo-organic catalyst, polymethylsiloxane and a microcrystalline paraffin wax. Processing requires heating the mixture to 110°-130° C. to insure adequate blending of the individual chemical compounds.

U.S. Pat. No. 3,723,342 discloses a defoamer for use in pulp mills comprising a silicone compound in the form of an oil blended with an aliphatic diamide, a low viscosity mineral oil and a spreading agent.

An improvement in the process of the '342 patent is disclosed in U.S. Pat. No. 3,935,121. The composition of the process contains an amide, a liquid hydrocarbon carrier, an emulsifier and a silicone oil. In the preparation of this composition, the blend must be heated to as much as 250° F. in order to obtain a clear melt.

U.S. Pat. No. 3,959,175 discloses a defoamer composition for use in aqueous systems comprising polybutene added to other compounds, such as surfactants, at least one of which must have a high melting point. It is most critical in this treatment that high melting point materials are present so that the resulting defoamer composition contains minute or precipitated particles.

BRIEF DESCRIPTION OF THE DRAWINGS

FIG. 1 shows the defoaming efficacy of 6 compounds.

FIG. 2 illustrates the exceptional defoaming characteristics of the inventive compositions.

FIG. 3 shows defoaming efficacy in the alkaline fine paper system of Example 2.

FIG. 4 shows defoaming characteristics of compounds 4 and 5 in the system of Example 2 at 41° C.

FIG. 5 shows the same as FIG. 4 except for the temperature being 49° C.

FIG. 6 shows defoaming efficacy in the system of Example 3.

FIG. 7 shows defoaming efficacy in a deinked recycled tissue mill system at 20° C.

FIG. 8 shows the same system as in FIG. 7 except that the temperature is 27° C.

FIG. 9 is a plot of dynamic surface tension.

FIG. 10 shows the defoaming efficacy of an effluent.

DETAILED DESCRIPTION OF THE INVENTION

Foaming problems associated with papermaking processing are significantly reduced or altogether prevented by the use of a foam control composition comprising a β-branched aldol ether alcohol in combination with at least one surfactant having a melting point or pour point less than 20° C. and a low HLB, high molecular weight EO-PO block copolymer. The aldol ether alcohol exhibiting the most desired properties according to this invention is of a relatively high molecular weight for compounds of this type, having a number average (mw) of 320-500. It has a chemical structure represented by the following formula:

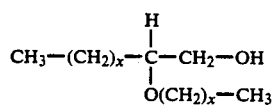

where x=5 to 8. The molecule has a low surface tension value of approximately 28 dynes/cm and a hydroxyl value of 90-140. Such a molecule may be obtained from Nova Molecular Technologies, Inc., Lake Geneva, Wis., under the trade name Nova Aldol Alcohol 21 ®.

The surfactants can include but are not limited to polyethylene glycol dioleate ester, sorbitan ester or polyoxyalkylene ester. Many polyethyl erie glycol esters are commercially available. A preferred polyethylene glycol surfactant is a PEG 600 (DO), available as MAPEG ® 600 (DO). Characteristic examples are available from the Mazer Chemical Company as PEG 200 dioleate (DO), PEG 200 ditallate (DT), PEG 400 dioleate (DO), PEG 400 ditallate (DT), PEG 600 dioleate (DO), and PEG 600 ditallate (DT). The sorbitan ester may be selected from POE(20) sorbitan trioleate or POE(40) sorbitol hexaoleate (both from Henkel). The polyoxyalkylene ester may be derived from polyoxyalkylene oleic acid which has the following structure:

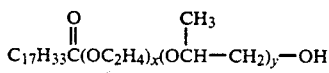

or, polyoxyalkylene dioleic acid which has the following structure:

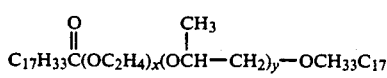

wherein x can be from 1-10 and y can be from 0 to 35 moles.

The block copolymer consists of one of the following structures:

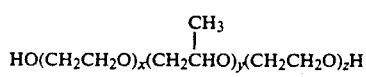

where $2 \leq x+z \leq 9$, x, $z \leq 0$, $36 \leq y \leq 90$,

where $14 \leq a+c \leq 25$, a, $c \leq 0$, $4 \leq b \leq 8$.

The numbers defining the amount of the repeat units represents the number of moles. Preferably, the x+z content is from 4 to 6 moles, y is from 50 to 70 moles, the a+c content is from 20 to 25 moles and b is from 5 to 7 moles. The average molecular weight of the block copolymer should be in the range of 2000-6000, preferably 3500-5000. It should have a low HLB in the range of 1-4, preferably 1-3, and a cloud point lower than 30° C., preferably in the range of 14°-25° C. Block copolymers are available from BASF under the PLURONIC ® series of commercial products.

This invention can be formulated at room temperature with no heating or cooling required. The blending of this aldol ether alcohol with the above surfactant(s) results in a foam control agent that is translucent, indicating complete blending, a characteristic which facilitates foam control function. Furthermore, such a composition is stable for at least three months, well beyond the product destabilization time exhibited by conventional treatment compositions. If desired, the mixture can be further diluted to 10-35% with water. The latter emulsion is thin, flowable and stable for up to 3 weeks for the purpose of short-term diluted product storage.

When a β-branched aldol ether alcohol is used with one or more surfactants having a pour point or melting point lower than 20° C. (e.g., PEG 600 DO), the product becomes cloudy at 10°-20° C. This cloudiness limits the use of this product, especially under cold temperature conditions when separation could occur. However, the addition of 5-13% water blended at room temperature provide a translucent, stable product at low temperature, probably due to the microemulsion formation or association of water molecules with surfactant molecules.

The relative amounts of the individual components of the present defoamer composition are as follows (values are in weight percent):

| Component          | Suitable | Preferred |
|--------------------|----------|-----------|
| Aldol Ether Alcohol | 20-80%   | 35-65%    |
| Surfactant(s)      | 10-40    | 18-32     |
| Block Copolymer    | 2-40     | 7-13      |
| Water              | 5-13     | 9-11      |

The amount of the composition of the present invention which is necessary to prohibit or reduce foam in the foaming medium depends upon the degree of active ingredients of the chemical components present. The amount of the antifoam/defoamer composition added to the foaming medium is an amount required to establish a concentration of from about 1.0 to about 500 ppm, based on volume. The preferable concentration range, however, is between 10 ppm and 100 ppm.

The composition of the present invention may be added either continuously or intermittently directly to the white water drainage tank or at any other location in the papermaking process where foaming occurs.

EXAMPLES

To illustrate the efficacy of the invention, a variety of pulp and paper processing waters are used as foaming media. The antifoams according to the invention can be used in aqueous paper processing foaming systems where temperatures range from 20° C.-60° C., including, but not limited to, pulp and paper mill effluent, and recycled fiber tissue machine water.

In evaluating the antifoam efficacy the medium is continuously circulated from a calibrated reservoir (0-295 cm) via a pump and is returned back to the reservoir. This action agitates the medium, which in turn causes foam. The test cell is filled with the medium at the desired operating temperature. The medium temperature can be held approximately constant with a set temperature controller and heat coil wrapped around the bottom cell reservoir. A known amount of the subject antifoam is introduced into the test cell medium before the pump is turned on. The pump and stop watch are started simultaneously and foam levels are recorded every 30 seconds until the foam reaches a maximum 295 cm level. At this point the pump and stop watch are turned off and the time is recorded as the top time. A longer time required for the foam to reach a certain level indicates a more efficacious antifoam. Another method for evaluating antifoam efficacy involves numerically integrating and obtaining the area under the foam height versus time curve for each sample. The smaller area under the curve usually indicates the ability of an antifoam to suppress or eliminate the foam better.

The following antifoams were used in several types of foaming media. Defoaming compositions 1-5, 9, and 10 were prepared as simple blends at room temperature.

| Defoaming Composition 1 | 100% PEG 600 ester (Mapeg ® 600 DO) Dilute with H₂O to 15% actives. |
|---|---|
| Defoaming Composition 2 | 100% Pluronic ® L-121 block copolymer Dilute with H₂O to 15% actives. |
| Defoaming Composition 3 | 100% Nova aldol ether alcohol 21-B ® (MW = 500) Dilute with H₂O to 15% actives. |
| Defoaming Composition 4 | 50% PEG 600 DO ester (Mapeg ® 600 DO) 50% Nova aldol ether alcohol 21-B ® (MW = 500) Dilute with H₂O to 15% actives. |
| Defoaming Composition 5 | 40% PEG 600 DO ester (Mapeg ® 600 DO) 40% Nova aldol ether alcohol 21-B (MW = 500) 20% Pluronic ® L-121 block copolymer Dilute with H₂O to 15% actives. |
| Defoaming Composition 6 | Fatty alcohol emulsion (13% actives) |
| Defoaming Composition 7 | Water-based defoamer containing ethoxylated material, organic ester and wax (14% actives). |
| Defoaming Composition 8 | Oil-based defoamer containing hydrocarbon oil, fatty alcohol, and PEG esters. |
| Defoaming Composition 9 | A mixture of polybutene and PEG esters. |
| Defoaming Composition 10 | 80% Nova aldol ether alcohol 21-B ® (MW = 500) 20% PEG 600 DO ester (Ethox DO-14 ®) |

EXAMPLE 1

Using the antifoam recirculation tester and method described above, the antifoam and its components were compared for efficacy. The medium used was obtained from an effluent stream of a paper mill. This effluent was tested at typical operating conditions of 30° C. and 38° C. at a pH of 7.7.

The foam cell test data indicates that the antifoam of the present invention (composition 5) exhibits improved foam control as compared to conventional antifoam treatments such as fatty alcohol emulsions. The results set forth in FIGS. 1 and 2 demonstrate that the antifoam of the present invention not only produces a higher top time but also generates a much lower area under the curve thus indicating exceptional defoaming performance. Testing indicates that the addition of the low HLB, high molecular weight Pluronic ® L-121 aids in antifoam efficacy especially at temperatures greater than 30° C. Addition of the high molecular weight aldol ether alcohol allows for a more stable, easily pumpable, lower viscosity emulsion as compared to the highly viscous 15%-25% emulsions of the Mapeg ® 600 DO ester or Pluronic ® L-121. As a result the emulsion makedown process becomes much easier. The aldol ether alcohol assists in quickly spreading or carrying the surfactant to the foam where the surfactant can effectively control the foam.

EXAMPLE 2

Alkaline fine paper synthetic white water was used as the foaming medium. This medium was prepared with the following ingredients (percentage by weight):

| Deionized Water | 98.3539% |
|---|---|
| CaCO₃ | 0.30% |
| Al₂(SO₄)₃.13H₂O | 0.012% |
| Rosin | 0.012% |
| NaCl | 0.0049% |
| MgSO₄ | 0.0015% |
| Na₂SO₄ | 0.089% |
| Na₂SiO₃.5H₂O | 0.0079% |
| CaCl₂.2H₂O | 0.0079% |
| Microcrystalline Cellulose | 0.79% |
| 37% Formaldehyde | 0.025% |
| AKD | 0.0059% |
| 5% Starch Solution | 0.39% |

The test procedure is as defined above.

FIGS. 4 and 5 display the results for foam cell tests conducted at 41° C. and 49° C. respectively at a pH of 7.6. As is evident from these figures, defoaming composition 5 exhibits improved foam control characteristics when compared to the same composition but without the block copolymer (defoaming composition 4). Hence, the addition of a small amount of a block copolymer (defoaming composition 5) to a conventional defoamer (defoamer composition 4) increases the efficacy considerably.

EXAMPLE 3

Alkaline fine paper synthetic white water was used as the foaming medium. This synthetic white water was prepared using the following ingredients (percentage by weight):

| Deionized Water | 73.749% |
|---|---|
| Tap Water | 25.00% |
| AKD | 0.006% |
| 5% Starch Solution | 0.40% |
| 5% Rosin Size Solution | 0.025% |
| 3% Al₂(SO₄)₃.13H₂O | 0.12% |
| 37% Formaldehyde | 0.10% |
| Microcrystalline Cellulose | 0.40% |
| CaCO₃ | 0.20 |

The test procedure is as defined above.

FIG. 6 schematically shows the results for foam cell tests conducted at 57° C. at a pH of 7.6. These results indicate that the defoamer of the present invention (defoaming composition 5) is superior to all of the conventional, prior-art defoamers such as the fatty alcohol emulsion (defoamer 6).

EXAMPLE 4

Using the test methods described above, the antifoam were evaluated in a medium obtained from a recycled fiber tissue mill. This deinked white water was tested at 20° C. and 27° C. at a pH of 7.9. FIGS. 7 and 8, respectively, illustrate the results of this testing. Again, it is apparent that the defoamer of the present invention (defoaming composition 5) is superior to conventional defoamers.

FIG. 9 reflects the dynamic surface tension of various antifoams in nanopure water as a function of time. The antifoam concentration is 0.10% by weight. As the bubbles begin to form, a liquid/gas interface is also created. It is well known that surfactants depress the surface tension of a liquid by adsorbing at the liquid/air interface. It is noteworthy that the bubble interval is related to the gas/liquid interface development time. As the bubble interval increases, the surfactant molecules have more time to migrate into the air/liquid interface, adsorb at the interface, and lower the surface tension until it reaches an equilibrium. FIG. 9 displays that the present formulation (defoaming composition 5) exhibits the lowest dynamic surface tension at short bubble intervals (<1 bubble/sec) when compared to other conventional antifoams (9, 10). A low dynamic surface tension is indicative of a high diffusion coefficient while a low static surface tension is indicative of a large spreading coefficient. Defoaming composition 5 possesses both low dynamic and static surface tensions (29 dynes/cm) which make this product very effective.

EXAMPLE 5

The standard antifoam efficacy comparison tests were conducted as described above. The test medium was obtained from a chemical treatment effluent pond. Tests were conducted at typical operating conditions of 32° C. at a pH of 6.8.

FIG. 10 displays the ability of the present antifoam invention (composition 5) to control foaming tendencies better than the other antifoams such as the fatty alcohol emulsion. The toptime or recirculation time of the defoaming composition 5 almost doubled that of the other conventional antifoams. Obviously the area-under-the-curve generated for defoamer 5 is much less than de- foamer 9 during the 180 sec. interval thus indicating superior foam suppression.

What we claim is:

1. A composition comprising a $\beta$-branched aldol ether alcohol, at least one surfactant having a melting point less than 20° C. selected from the group consisting of polyethylene glycol dioleate ester and sorbitan ester, a low HLB, ethylene oxide-propylene oxide block copolymer and water wherein the relative amounts of the $\beta$-branched aldol ether alcohol:surfactant:block copolymer:water are 20–80%: 10–40%:2–40%:5–13%, by weight, with the proviso that the total equals 100%.

2. The composition of claim 1 wherein the $\beta$-branched aldol ether alcohol comprises the structure:

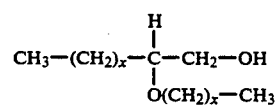

wherein x=5 to 8.

3. The composition of claim 1 wherein the ethylene oxide-propylene oxide block copolymer comprises the structure:

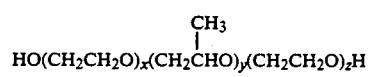

where $2 \leq x+z \leq 9$, x, $z \neq 0$, and $36 \leq y \leq 90$.

4. The composition of claim 1 wherein the ethylene oxide-propylene oxide block copolymer comprises the structure:

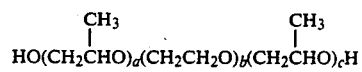

where $14 \leq a+c \leq 25$, a, $c \leq 0$, $4 \leq b \leq 8$.

5. The composition of claim 1 wherein the average molecular weight of the block copolymer is from about 2000 to 6000.

6. The composition of claim 1 wherein the block copolymer has a HLB of about 1–4.

* * * * *